Nov. 1, 1966  O. R. WERMLINGER  3,282,069
PRELOADED OVERRIDE SPRING DEVICE
Filed Nov. 27, 1964  4 Sheets-Sheet 1

INVENTOR.
OSCAR R. WERMLINGER
BY
Constantine A. Michalos
ATTORNEY

INVENTOR.
OSCAR R. WERMLINGER
BY
Constantine A. Michalos
ATTORNEY

Nov. 1, 1966     O. R. WERMLINGER     3,282,069
PRELOADED OVERRIDE SPRING DEVICE

Filed Nov. 27, 1964     4 Sheets-Sheet 4

INVENTOR.
OSCAR R. WERMLINGER
BY
Constantine A. Michalos
ATTORNEY

United States Patent Office 3,282,069
Patented Nov. 1, 1966

3,282,069
PRELOADED OVERRIDE SPRING DEVICE
Oscar R. Wermlinger, Westwood, N.J., assignor to The Bendix Corporation, Teterboro, N.J., a corporation of Delaware
Filed Nov. 27, 1964, Ser. No. 414,086
4 Claims. (Cl. 64—27)

This invention relates generally to a fail operative servo mechanism system, and particularly to a fail operative rudder power control override spring device used in aircraft automatic flight control subsystems, and more particularly to a fail operative rudder power control preloaded override spring device with a mount used in conjunction with a servo actuator in a dual servo mechanism system application for a rudder power control, as more fully described in a copending U.S. application Ser. No. 414,564, filed November 30, 1964 by Franchi et al. and assigned to The Bendix Corporation, the same assignee as the present invention.

Heretofore, a dual servo mechanism system with a failure detector was provided in an aircraft automatic flight control subsystem for rudder power control but with no means of overriding any failures of the servo mechanism or for minimizing or eliminating any extraneous inputs to the system. Originally, one of the servo systems was clutched to a load while the other servo system was unclutched and was only used to monitor the first servo system. Monitoring was accomplished by comparing the servo position follow-ups. Theoretically, since both systems were identical, the summation of the follow-ups would be zero except for the malfunction of one system or the other. Practically speaking, this system had tracking differences by virtue of tolerance build up, and analytical studies indicated that the comparator threshold for alarm could be set to allow a one degree per second yaw rate differential. The one degree per second yaw rate threshold provided adequate protection against nuisance disconnects due to tolerance build-ups.

This alone was not the only difficulty encountered in the servo mechanism system. It should be noted that during development testing of a rudder flight control system on a simulator, it was determined that the pilot's input to the control system adversely affected the monitoring. That is to say, the control valve used to actuate the rudder was rate limited and for rapid pilot inputs, would momentarily act as a fixed point. The pilot input would load up on the "on line" servo system. This loading would result in a "follow-up" discrepancy sufficient for a nuisance alarm.

The obvious solution to this problem was to introduce the pilot's input to both servos simultaneously. This was done by operating both systems "on line," (clutching both servos to the load). The disadvantages of this system as it existed meant that both servos would have to be rigidly tied together such that the "follow-ups" could never disagree except for the backlash. Displacement monitoring, therefore, would be impossible.

The more complete solution of the problem lies in providing a flexible means such as a preloaded override spring device introduced between the output shafts of each servo actuator and the load of a dual servo assembly. The present invention, therefore, provides for a fail operative rudder power control preloaded override spring device which is preloaded to a specific requirement. The servo mechanism system comprises a spring device and a servo assembly. This spring device is used in a dual aircraft flight control subsystem for rudder power control, as more specifically described in the aforementioned copending U.S. application Serial No. 414,564. Each spring device is preloaded to a specified requirement to function in series between an input spline of an actuating system and a bell crank. This specific preloaded override spring device may have a travel or rotating motion of thirty degrees clockwise and thirty degrees counterclockwise. The bell crank, which connects the override preloaded spring device to a hydraulic power control valve, as provided in the copending U.S. application Ser. No. 414,564, to drive the rudder of the aircraft is free to rotate for twenty-five degrees clockwise and twenty-five degrees counterclockwise from the mean center line of the input shaft of the servo actuator, connected in line with a shaft of the override spring device, as hereinafter more fully described.

Therefore, a principal object of this invention is to provide a preloaded override spring device in a mechanism having a preloaded arrangement such as a cluster of leaf springs to permit actuation of the device either in a clockwise or counterclockwise direction through a neutral position while maintaining a preload at all times.

Another object of this invention is to provide for a fail operative rudder power control override preloaded spring device for a rudder actuating mechanism within a flight control system to attenuate unwanted inputs.

Another object of this invention is to provide for a mechanism to allow detection when two servos are coupled to a common load.

A further object of this invention is to provide a flexible linkage means that can be used between two servo systems to minimize or eliminate a complete failure of both servo systems due to the failure of one servo system when the two servo systems are coupled to a common load.

An additional object of this invention is to provide an override preloaded spring device which when it is used in a dual servo system coupled to the same load, the linkages of one servo actuator of one servo system can function normally and will only override the opposite servo actuator of the other servo system if said other servo actuator or its system fails to operate or when corrective action is required to compensate for torque discrepancy between the two systems.

Still another object of the invention is to provide a simplified apparatus having a minimum number of parts which is compact and light weight, and which can be easily disassembled and assembled and can be inserted within a dual servo control system permitting one servo system to function independently of the other when one of said servo systems fails in its operation.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
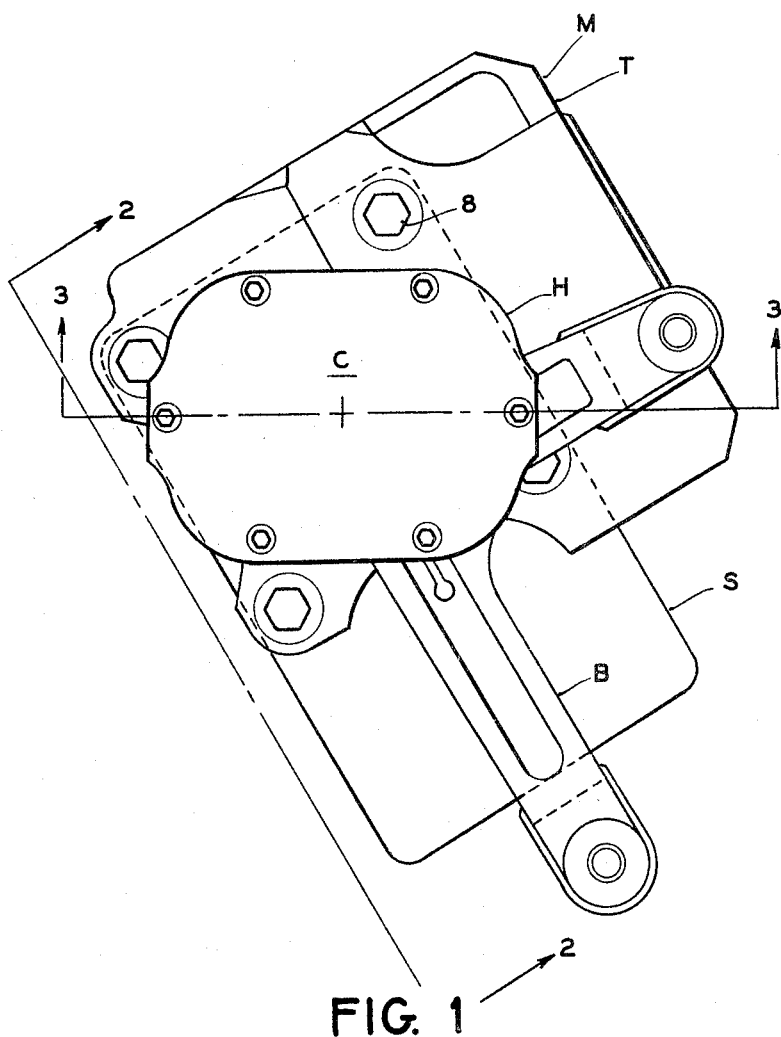
FIGURE 1 is a plan view of a servo mechanism system including a preloaded override spring device, mount and servo mechanism in accordance with a preferred embodiment of this invention.
Figure 2:
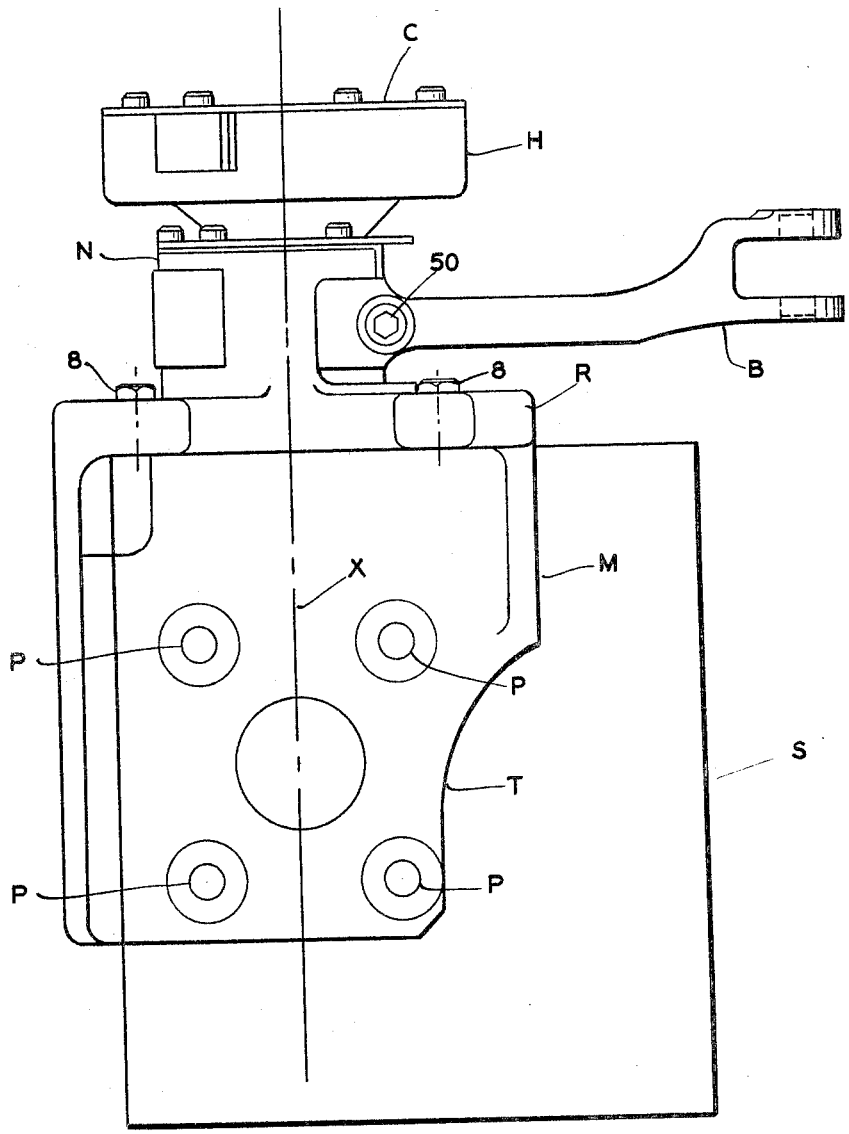
FIGURE 2 shows a front elevational view of the servo mechanism system taken substantially along line 2—2 of FIGURE 1.

Referring now to the drawings, a fail operative rudder power control preloaded override spring device A (see FIGURE 3) is contained within a housing H enclosed by a cover C supported for rotation, on a mount M, by a bell crank B interposed longitudinally between the housing H and the mount M. In addition, supported on the mount M is one of a pair of servo mechanisms S of a dual fail operative rudder power control system, as more fully described in the aforementioned copending U.S. application Ser. No. 414,564. The servo mechanism S is integrally connected to the preloaded override spring device A which extends into a neck portion N of the mount M, as hereinafter more fully described.

It should be noted that the housing H and the servo mechanism S are fastened together by four bolts 8 on a bracket portion R of the mount M. The preload override spring device A and the servo mechanism S are fastened together as one integral unit and are ball bearing mounted within the neck portion N of the mount M for rotation by the bell crank B about an axis X, as hereinafter more fully described. The mount M with the servo mechanism S and spring device A may be secured onto the structure of an aircraft by bolts (not shown) inserted within openings P located on another bracket portion T of the mount M.

It should be noted again that the bracket portion T extends perpendicular to the bracket portion R and both bracket portions T and R are perpendicular to a side wall D to form therewith the mount M in which the servo mechanism S is mounted for rotation onto the bracket portion R by the four bolts 8. The servo mechanism S is coaxially connected to the override spring device A through an internally splined member along the axis X, as hereinafter more fully described.

Figure 3:
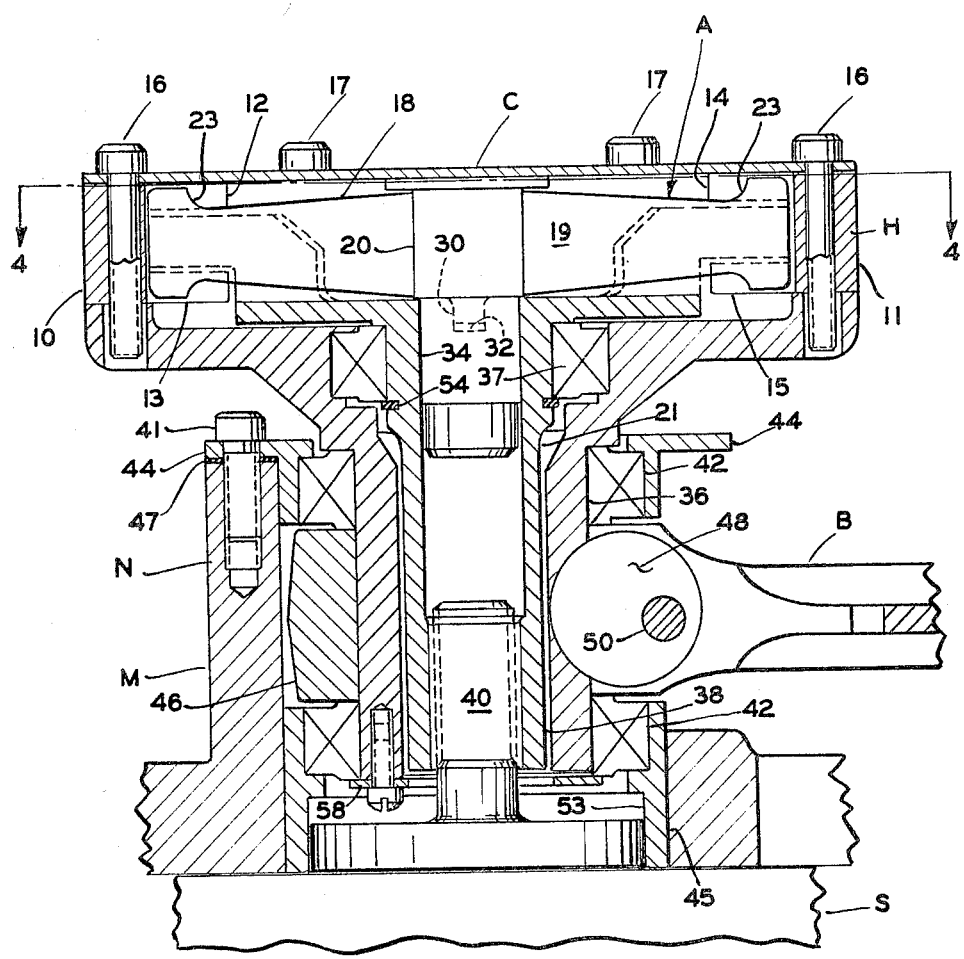
FIGURE 3 is an enlarged sectional view of the preloaded override spring device with a fragmentary portion of the mount and servo mechanism, taken substantially along line 3—3 of FIGURE 1.
Figure 4:
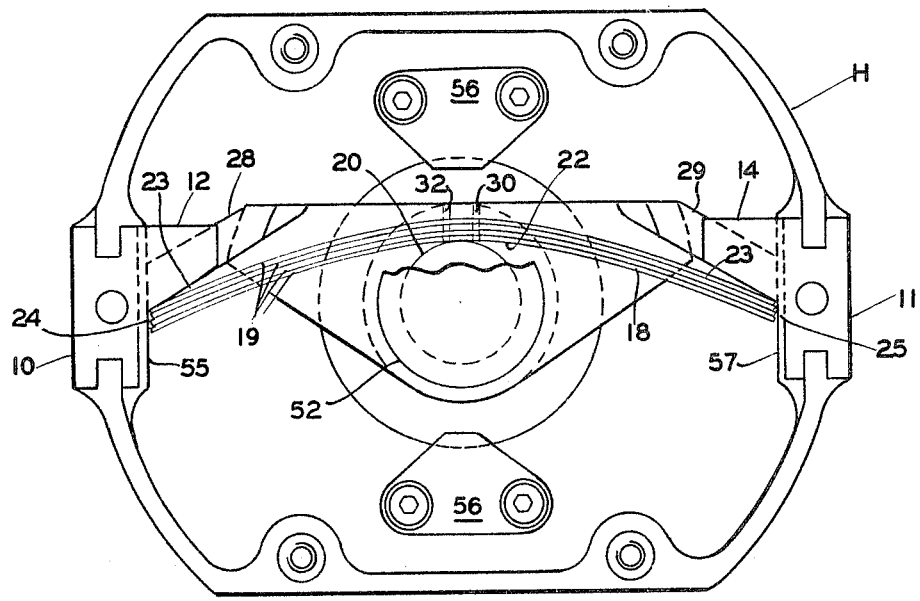
FIGURE 4 shows a top plan view of the preloaded override spring device with the cover removed to show the preloaded spring features, taken substantially along line 4—4 of FIGURE 3; and, FIGURE 5 shows a top plan view of the preloaded override spring device as in FIGURE 4 but with the override spring device shown in a different position of operation.
Figure 5:
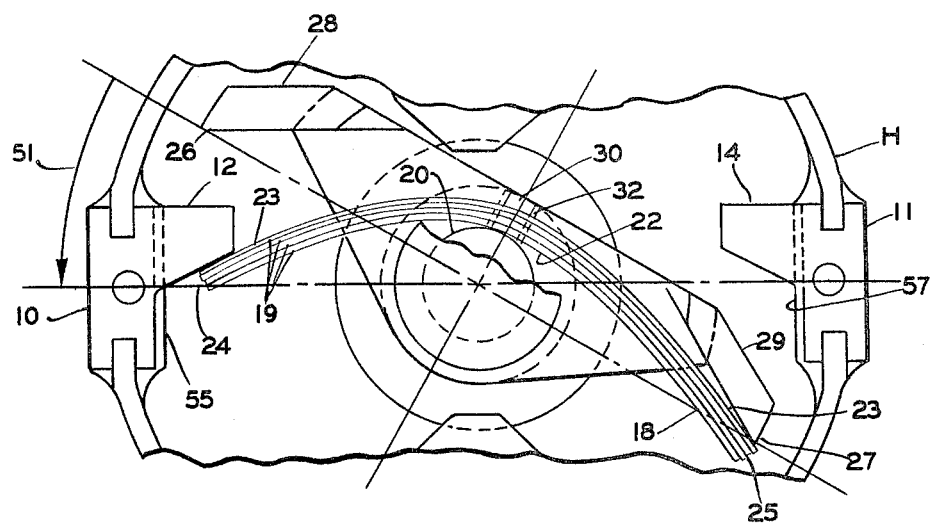

In detail, as best shown in FIGURES 3, 4 and 5, the preloaded override spring device A provides for retainer means 10 and 11, each having a pair of stops 12–13 and 14–15, secured within each side portion of the housing H. The retainers 10 and 11 are also secured to the housing H with the cover C by means of bolts 16. In addition, the cover C is rigidly mounted onto the housing H by means of bolts 17 to thereby securely enclose the preloaded override spring device A within the housing H.

A spring 18, consisting of a plurality or cluster of leaf spring 19, is mounted around a post 20 of a shaft 21. The spring 18 is provided with a preload or tensioned arrangement obtained by being wedged between the post 20 and the retainers 10 and 11, as best shown in FIGURE 4. That is, a central portion 22 of the cluster of springs 19 is adjacent the post 20. The cluster of springs 19 are arranged in such a way that their end portions 23 extend on each side of their central portion 22 so that edges 24 and 25 of each of the cluster of springs 19 are retained only by edges 26 and 27 of a pair of outwardly extending wing portions 28 and 29 of the shaft 21.

Normally, the cluster of springs 19 is in the form of individual laminations made of a material which is commonly known as high speed steel, which retains its hardness and resiliency over many actuations. As shown, the inside face of each wing portion 28 and 29 of the shaft 21, facing the spring 18, is at an angle to the end portions 23 of the spring 18, facing the wing portions 28 and 29, as best shown in FIGURE 4. This permits the edges 26 and 27 of the wing portions 28 and 29 to always retain only the edges 24 and 25 of the springs 19. Thereby, this provides a constant spring factor in whatever position of the operations the override spring device is located, since the distance from the central portion 22 of the spring 18 to the edges 24 or 25 remain substantially constant.

It is also to be noted that the central portion 22 of the springs 19 are stacked in proper registration by means of tabs 30 integral to and extending out of the side edges of each leaf spring 19 into a groove 32 formed within the shaft 21. Additionally, it should be noted that the end portions 23 of the leaf springs 19 assume identical shapes, as illustrated in FIGURE 3, in order that they can contact both the stops 12–13 and 14–15 of the retainers 10 and 11 and the edges 26 and 27 of the wing portions 28 and 29 of the shaft 21 which are interposed between each set of stops 12–13 and 14–15. The post 20 is made an integral part of the shaft 21 by being pressed within a hollow portion 34 of the shaft 21, as best shown in FIGURE 3.

As illustrated in FIGURE 3, the shaft 21 is supported for rotation within a neck portion 36 of the housing H by ball bearings 37. The opposite end of the shaft 21 is supported by ball bearings (not shown) in the servo mechanism S through its externally splined shaft 40. The shaft 21 is internally splined at its end portion 38 and is secured to the servo mechanism S through its externally splined shaft 40.

External to the neck portion 36 of the housing H is located a pair of ball bearings 42. The bearings 42 are interposed between the neck portion 36 of the housing H and the neck portion N of the mount M. Longitudinally spaced from each other and inserted between the bearings 42 and the neck portion N of the mount M are a pair of liners or retainer bearings 44 and 45 which also retain the ball bearings 42 on the neck portion 36 of the housing H. The bell crank B is interposed between the bearings 42 longitudinally extending along the neck portion 36 of the housing H. That is, as shown, the neck portion 36 of the housing H is inserted within a ring portion 46 of the bell crank B between the bearings 42, and are held in place by the retainers 44 and 45 by bolts 41 and 8 through the servo mechanism S. For bearing end play adjustment, shims 47 are provided between the neck N of the mount M and the bearing retainer 44.

It should be noted that the principal feature of the override spring mechanism A is the spring 18 preloaded by the post 20 and retainers 10 and 11 to permit actuation of the device from clockwise to counterclockwise direction through a neutral or zero position while always maintaining a preload for its proper operation, as herein more fully described. For example, when the housing H is rotated by the bell crank B in a counterclockwise direction, as viewed in FIGURES 4 and 5, and the shaft 21 is locked in a zero position by a fail operative servo mechanism S, one end of the spring 18 flexes around post 20 by the retainer 10 while the opposite end of the spring 18 is retained by the edge 27 of the wing portion 29 of the shaft 21, as best shown in FIGURE 5.

The same holds true when the housing H is rotated in the opposite direction. The housing H would be rotated in a clockwise direction as viewed in FIGURES 4 and 5, through the attached bell crank B. Since the shaft 21 would be locked in a zero position by the servo mechanism S, when it had failed to operate, one end of the spring 18 would flex around the post 20 by the retainer 11 while the opposite end of the spring 18 is retained by the edge 26 of the wing portion 28 of the shaft 21. The edge 26 of the wing portion 28 will contact the spring 18 at its end 23 to remove the spring 18 off said retainer 10, as the housing H is rotated by the bell crank B, to a position just opposite to that shown in FIGURE 5.

The main purpose of this arrangement, therefore, is to be able to actuate one servo mechanism in a dual servo system even though the other servo mechanism is not operating. Therefore, a control valve, as described in the copending U.S. application Ser. No. 414,564, for the rudder of the aircraft may be operated by the operable servo mechanism through the flexible preloaded override spring device A, in either clockwise or counterclockwise direction, by a command signal of the subsystem, even though one servo mechanism is jammed. Therefore, in a dual system, the linkage of one servo mechanism can function normally and would override the opposite servo mechanism if it failed to operate, or in a case where any corrective action is required to compensate for torque.

Referring more specifically to FIGURE 3, the servo mechanism S is shown mounted to the bracket R while it was piloted for alignment in bore 53 of the liner 45 within the mount M to thereby couple together the externally splined shaft 40 of the servo mechanism and the internally splined end portion 38 of the shaft 21. Therefore, when the servo mechanism S is energized, upon a signal command, the shaft 21 together with a housing H and bell crank B, will rotate, and then by linkage connected to the bell crank B, will actuate the hydraulic valve for rudder control as more specifically described in the copending U.S. application Ser. No. 414,564.

The spring 18 of the preloaded override spring device A will only flex for actuation as shown in FIGURE 5 in a fail operative condition of the servo mechanism S or if the resisting torque applied is greater than the specified preload of the spring device A.

It should be understood that the preloaded override spring device A can be readily furnished to any desired preload and spring rate in several ways: First, by installing a selected number of springs to vary the overall thickness of the spring 18; Second, by reducing the actual thickness of each leaf spring 19 while increasing the number of leaf springs 19; Third, by changing the diameter of the post 20 to cause the spring to initially bend a little further; and, Fourth, the flat leaf spring can be designed and shaped to suit any desired value required by the system.

As best shown in FIGURE 3 of the drawing, each leaf spring 19 is provided with the tab 30 for retaining it in the groove 32 located within the rotating shaft 21 to prevent friction at the edges 24 and 25 of the leaf springs 19 with the sides 55 and 57 of the retainers 10 and 11. The addition of the leaf springs 19 are restrained within the housing H by a flange 52 integral to the post 20. The flange 52 also protects the leaf springs 19 against friction with the cover C located at the end of the housing H.

In detail, and as described before, the internal splined shaft 21 is mounted for rotation about the housing H by the ball bearing 37 and the end ball bearings (not shown) provided within the servo mechanism S. The ball bearings 37 and the ball bearings of the servo mechanism S provide for support on opposite ends of the shaft 21 when both the servo mechanism S and shaft 21 are coupled together through their male and female splined shafts. The housing H and bell crank B are integrally fastened together and mounted on the ball bearings 42 at both sides of the ring portion 46. For bearing end play adjustment, shims 47 are provided between the mount M and a bearing retainer 44. To assure no lost motion, the bell crank B is keyed to the housing by the key 48; and in addition, the bell crank B is also securely clamped to the housing H by the nut and bolt arrangement 50. A spirolex type retainer ring 54 is provided to retain ball bearing 37 on the shaft 2. The ring 54 is entrapped by a proper sized groove in the shaft 21 to prevent disengagement of the bearing 37 when the unit is subjected to shock and vibration. In addition, as can be noted from FIGURE 4 of the drawing, two retainer plates 56 hold down the shaft 2 with the bearings 37 within the housing H. Another retainer plate 58 is fastened to the bottom end of the housing H to clamp together the two ball bearings 42 and the bell crank B so that no end play can exist. In normal operation, the spring 18 will be positioned against the retainers 10 and 11, as shown in FIGURE 4. In this respect, it will act as a rigid link since both servos would be working and both would drive the load in parallel.

If one servo mechanism fails, and the shaft becomes locked, in order for the other servo mechanism to operate the system normally, it must override the spring preload of the inoperative spring device to actuate the rudder control as shown in the copending U.S. application Ser. No. 414,564. That is, one end of the spring 18 will flex around the post 20 by one of the retainers, as shown in FIGURE 5. The opposite end of the spring will be retained by the edge 27 of the wing portion 29 of the shaft 21. The operating servo mechanism will drive the inoperative servo mechanism and since the inoperative servo mechanism is rigidly connected to the housing H through the splined coupling, such as shown in FIGURE 3, it will rotate the housing H to thereby move the spring 18 either clockwise or counterclockwise away from one of the retainers 10 or 11 as hereinbefore described.

Therefore, this device provides for the continued operation of the dual servo system upon the failure of one servo system. This results because the preloaded spring device A acts as a flexible coupling between the two servo systems which introduces lost motion into the system.

Therefore, the main function of this preloaded override spring device is to provide for actuation of the linkage by one servo mechanism to operate the hydraulic power valve for rudder control by a command signal even though one servo system is inoperative.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A fail operative preloaded override spring device comprising, a housing, a shaft in a rotatable relation to said housing, a pair of retainers mounted on said housing, spring means extending from one retainer to the other and having an intermediate portion offset by said shaft to flex the spring means and providing a preload condition between said shaft and said housing, for providing relative rotation of said housing and said shaft upon a torque applied to said housing exceeding the preload between said shaft and said housing, and wherein said shaft further comprises a pair of wing members extending on each side of an intermediate portion thereof and wherein said retainers support said spring in said preload position and each of said wing members of said shaft being interposed between one retainer and one end of said spring means and operable for disengaging said spring means off said one of retainers upon rotation of said housing in one direction due to a predetermined load exceeding the preload of said spring means between said shaft and said housing.

2. A fail operative preloaded override spring device comprising, a housing, a shaft in a rotatable relation to said housing, a pair of retainers mounted on said housing, spring means extending from one retainer to the other and having an intermediate portion offset by said shaft to flex the spring means and providing a preload condition between said shaft and said housing, for providing relative rotation of said housing and said shaft upon a torque applied to said housing exceeding the preload between said shaft and said housing, and wherein said spring means further comprises a plurality of steel leaf springs, said leaf springs including tabs integral to and extending out from the intermediate portion of said springs and said shaft including a groove formed therein supporting the tabs of said springs, so that when said housing is rotated relative to said shaft there is provided a simultaneous rotation of each of said springs about said shaft to retain the distance from the intermediate portion of said springs to their ends substantially constant thereby maintaining a constant spring factor in whatever position of operation of said springs relative to said housing.

3. A preloaded override spring device for use in aircraft flight control systems comprising, a housing, a pair of stops extending diametrically opposite internally of said housing, a shaft rotatable within said housing adjacent to and substantially in line with said stops, a plurality of springs extending from one of said pair of stops to the other of said pair of stops, and engaging said retainers at one side with said shaft engaging said springs at the other side and offsetting an intermediate portion of said springs to produce a preload within said springs, a pair of wings extending from said shaft and engaging said spring on the same side as said stops for providing a preloaded connection between said housing and said shaft, so that the housing is normally fixed relative to said shaft when said shaft is retained in a neutral position, whereby said housing may be rotated independent of the rotation of said shaft upon a predetermined load exceeding the preload of said springs.

4. A system operable for providing a flexible linkage between a mechanism and a load for overriding said mechanism to drive said load upon failure of said mechanism, the improvement comprising a bracket having supporting means for mounting onto a frame of an aircraft, a mechanism connecting said bracket, a housing, bearings interposed between said bracket and said housing, said housing operable for rotation on said bearings on said bracket, a shaft rotatable within said housing and connecting said mechanism for rotation therewith, said housing including inwardly directed stops diagonally extending in the internal periphery of said housing, spring leaves extending from one of said stops to the other of said stops, said stops being positioned diagonally across said housing, and said spring leaves offset and partially encircling said shaft for producing thereby a preload within said spring leaves, said spring leaves having end portions and said shaft having wing portions extending on each side of the shaft and operable to engage the end portions of said spring leaves for rotating said housing relative to said shaft at a predetermined load in excess of the preload of said spring leaves to move said housing relative to said shaft upon failure of said mechanism causing immobility within said mechanism so that said mechanism may be overridden for rotating the housing to permit driving of said load in the event of failure of said mechanism.

References Cited by the Examiner
UNITED STATES PATENTS

| | | | |
|---|---|---|---|
| 1,468,322 | 9/1923 | Odom | 64—29 |
| 1,729,435 | 9/1929 | Bethel | 64—27 |
| 1,729,442 | 9/1929 | Hornbostel | 64—27 |
| 1,896,025 | 1/1933 | Griswold | 64—27 |
| 1,962,993 | 6/1934 | Leece | 64—15 |
| 2,484,321 | 10/1949 | Stubau | 64—27 |

FOREIGN PATENTS 349,027   5/1931   Great Britain.

FRED C. MATTERN, Jr., *Primary Examiner.*

HALL C. COE, *Examiner.*